United States Patent [19]
Sicken et al.

[11] Patent Number: 5,985,965
[45] Date of Patent: *Nov. 16, 1999

[54] FLAME-RESISTANT POLYURETHANES

[75] Inventors: Martin Sicken, Cologne; Horst Staendeke, Lohmar, both of Germany

[73] Assignee: Clariant GmbH, Hurth-Knapsack, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/798,783

[22] Filed: Feb. 11, 1997

Related U.S. Application Data

[63] Continuation of application No. 08/615,767, Mar. 14, 1996, abandoned, which is a continuation of application No. 08/354,950, Dec. 13, 1994, abandoned.

[30] Foreign Application Priority Data

Dec. 16, 1993 [DE] Germany .............................. 43 42 973

[51] Int. Cl.⁶ ..................................................... C08K 5/52
[52] U.S. Cl. ............................. 524/127; 521/85; 521/107; 528/72
[58] Field of Search ..................... 521/85, 107; 524/127; 528/72, 287, 321

[56] References Cited

U.S. PATENT DOCUMENTS

| | | | |
|---|---|---|---|
| 3,442,827 | 5/1969 | Friedman | 528/72 |
| 3,639,545 | 2/1972 | Wilcox | 528/72 |
| 3,652,743 | 3/1972 | Harris et al. | 528/287 |
| 3,764,640 | 10/1973 | Klose | 528/72 |
| 3,767,732 | 10/1973 | Klose | 528/72 |
| 3,850,859 | 11/1974 | Wortmann et al. | 521/85 |
| 4,458,035 | 7/1984 | Hardy et al. | 521/107 |
| 4,594,364 | 6/1986 | Pawlowski et al. | 521/85 |
| 5,608,100 | 3/1997 | Sicken | 558/164 |
| 5,618,867 | 4/1997 | Bright et al. | 524/127 |
| 5,728,746 | 3/1998 | Sicken | 528/72 |

FOREIGN PATENT DOCUMENTS

| | | |
|---|---|---|
| 15 20 503 | 4/1969 | European Pat. Off. . |
| 2 099 558 | 3/1972 | France . |
| 2036587 | 4/1974 | Germany . |
| 2036595 | 8/1976 | Germany . |
| 2306592 | 5/1984 | Germany . |

*Primary Examiner*—Veronica P. Hoke
*Attorney, Agent, or Firm*—Connolly Bove Lodge & Hutz LLP

[57] ABSTRACT

The flame-resistant polyurethanes of the invention comprise, as flameproofing agents, mixtures of oligomeric phosphoric acid esters which carry hydroxyalkoxy groups, of the formula I

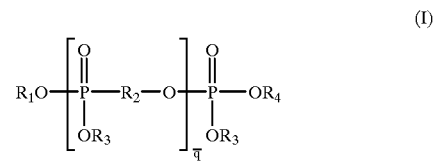

in which $\bar{q}$ denotes an average chain length of 0.5 to 10, $R_1$ is a hydroxyl-containing radical of the formula II a, $R_2$ is a radical of the formula III

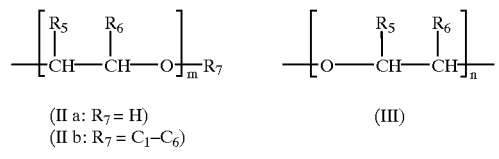

(II a: $R_7$ = H)
(II b: $R_7$ = $C_1$–$C_6$)
(III)

$R_3$ is a radical of the formula II b, $R_4$ is $R_1$ or $R_3$; $R_5$, $R_6$ and $R_7$ are an H atom or an alkyl radical having 1 to 6 carbon atoms, m is 0 to 4 and n is 1 to 4.

4 Claims, No Drawings

FLAME-RESISTANT POLYURETHANES

This application is a continuation of application Ser. No. 08/615,767 filed on Mar. 14, 1996 now abandoned, which is a continuation of Ser. No. 08/354,950, filed Dec. 13, 1994 (now abandoned).

The invention relates to flame-resistant polyurethanes which are obtainable by polyaddition of polyisocyanates onto polyols with addition of oligomeric, halogen-free phosphoric acid esters which carry hydroxyalkoxy groups.

Polyurethane foam can be used in fields of use which impose high requirements on the burning properties of the materials employed (for example automobile interior fittings and building insulations) only with the aid of the additional use of flameproofing agents. The majority of these flameproofing agents, such as, for example, tris(2-chloroethyl) phosphate, tris(chlorisopropyl) phosphate, tris(2,3-dichloropropyl) phosphate and tetra- kis(2-chloroethyl) ethylene diphosphate, are incorporated as additives, which can lead to partial emigration thereof under exposure to heat. This adverse affect, which plays a considerable role above all in open-cell foams, not only causes a decrease in the flameproofing action in the course of time and therefore an increase in the amount of flameproofing agent to be employed, but also leads to contamination of the environment of the product. Thus, for example, such additive additions contribute to so-called "fogging", condensation of vaporized volatile constituents from the interior fittings of the motor vehicle on the windshield. This phenomenon can be determined quantitatively in accordance with DIN 75201.

The use of reactive (instead of additive) flameproofing agents is a considerable improvement in this respect; in the case of polyurethane, for example, of phosphorus- and chlorine-containing polyols which are reacted with polyisocyanates, by themselves or as a mixture with conventional polyols, and are thus covalently bonded into the polymer matrix.

Products having a good flameproofing action are described in DE-C 20 36 595 and DE-C 20 36 587. These are mixtures of oligomeric phosphoric acid esters, for example of the formula (1),

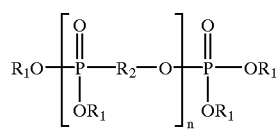
(1)

in which n is 0 to 4, $R_1$ is a halogenated alkyl or aryl radical and at least one hydroxyl-containing radical of the formula (2), and $R_2$ is a radical of the formula (3), in which, in the formulae (2) and (3), $R_3$ and $R_4$ are a hydrogen atom or an optionally chlorine-substituted alkyl radical and m is a number from 1 to 4.

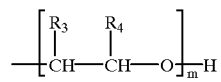
(2)

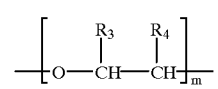
(3)

DE-C 20 36 592 furthermore describes a process for the preparation of flame-resistant polyurethane foams which comprise reaction products of the formula (1) as flameproofing agents.

The abovementioned products of the formula (1) have the common feature that they comprise halogen in bonded form as an essential constituent for achieving the required flameproofing effectiveness. This is a disadvantage, since halogen-containing products can liberate corrosive hydrogen halides and, under certain circumstances, toxic decomposition products in the event of a fire.

U.S. Pat. No. 4,458,035 describes polyurethane foams which comprise oligomeric phosphoric acid esters of the formula (4) in which n is 0 to 10, R is an alkyl or haloalkyl radical ($C_1$–$C_{10}$) and $R_1$ and $R_2$ are hydrogen atoms or alkyl or haloalkyl radicals ($C_1$–$C_{10}$).

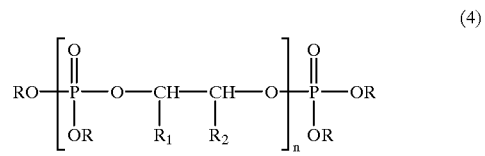
(4)

However, products of the formula (4) contain no hydroxyl groups which are capable of reaction with isocyanates, and accordingly are not capable of being incorporated, which has the abovementioned disadvantages. An adequate flameproofing effectiveness furthermore is demonstrated only for halogen-containing products of the formula (4).

The object of the present invention was thus to develop polyurethane foams which are permanently flameproofed by active halogen-free flameproofing agents.

This object is achieved by flame-resistant polyurethanes which comprise, as flameproofing agents, mixtures of oligomeric phosphoric acid esters which carry hydroxy-alkoxy groups, of the formula I

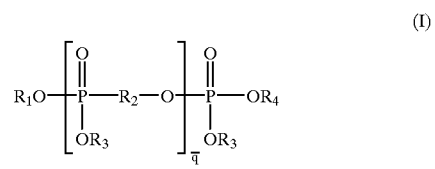
(I)

in which $\bar{q}$ is an average chain length of 0.5 to 10, $R_1$ is a hydroxyl-containing radical of the formula II a, $R_2$ is a radical of the formula III

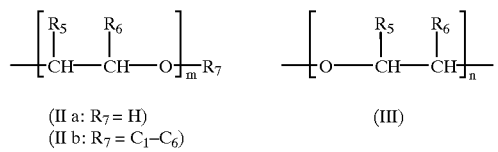

(II a: $R_7$ = H)  (III)
(II b: $R_7$ = $C_1$–$C_6$)

$R_3$ is a radical of the formula II b, $R_4$ is $R_1$ or $R_3$; $R_5$, $R_6$ and $R_7$ are an H atom or an alkyl radical having 1 to 6 carbon atoms, m is 0 to 4 and n is 1 to 4.

According to the invention, the flameproofing agent mixtures of the formula I are obtained by reacting one or more ortho-phosphoric acid esters of the formula IV

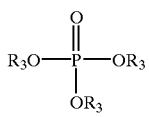

with phosphorus pentoxide in a first stage in a manner which is known per se in a molar ratio of (2.1 to 3.5): 1.0 at a temperature of 20 to 180° C. in the course of 0.5 to 72 hours, in the resulting polyphosphoric acid ester mixture of the formula V, in which $\bar{p}$ denotes an average chain length of 4 to 60,

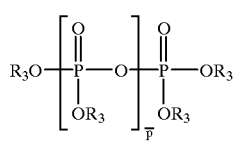

partly hydrolyzing or glycolyzing the P—O—P bonds selectively in a second stage by addition of water or a glycol of the formula VI

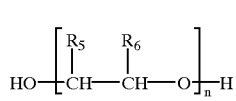

in which $R_5$, $R_6$ and n have the abovementioned meaning, at a temperature of 20 to 100° C., and reacting the resulting mixture of polyphosphoric acid partial esters of the formula VII

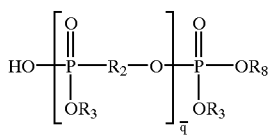

in which $R_2$ has the abovementioned meaning or is zero, $\bar{q}$ denotes a reduced average chain length of only 0.5 to 10 and $R_8$ has the meaning of $R_3$ or is an H atom, with an epoxide of the formula VIII in a third stage at a temperature of 20 to 180° C.

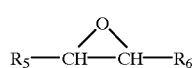

The preparation of the flameproofing agent mixtures of the formula I moreover optionally and preferably can also comprise, according to the invention, a) carrying out the reaction during the first stage at a temperature of 60 to 120° C. in the course of 0.5 to 6 hours;
b) carrying out the partial hydrolysis of the second stage at 50 to 80° C.;
c) adding 0.2 to 1.5 mol of water, per mole of orthophosphoric acid ester of the formula (IV) employed in the first stage, for the partial hydrolysis in the second stage;
d) carrying out the reaction in the first stage in the presence of 0.1 to 2% by weight of phosphorous acid $H_3PO_3$ calculated with respect to the total amount of starting substances in the first stage;
e) carrying out the reaction during the third stage at a temperature of 70 to 140° C.

Preferred starting substances of the formula IV for the first process stage are those where $R_3$ is methyl, ethyl, butyl or butoxyethyl, methyl and ethyl being particularly suitable. Epoxides of the formula VIII are preferably those in which $R_5$ and $R_6$ are a hydrogen or methyl radical, in particular ethylene oxide and propylene oxide.

The composition of the flameproofing agent mixtures of the formula I of virtually exclusively hydroxyl-containing components is achieved by the following procedure: in the first process stage, a molar ratio of the starting subtances of (2.1 to 3.5) to 1 (products of the formula IV: $P_4O_{10}$) is chosen, polyphosphoric acid esters of the formula V having high average degrees of condensation ($\bar{p}$=4 to 60) being chiefly obtained. By the partial hydrolysis or glycolysis of the polyphosphoric acid esters which follows in the second stage, the average degree of condensation $\bar{q}$ is reduced to $\leq 10$, preferably to 2 to 5, by the selective cleavage of P—O—P bonds which occurs. Higher average chain lengths lead to high viscosities of the end products, which causes use problems (metering); low average chain lengths result in relatively low phosphorus contents in the end product, which leads to losses in flameproofing effectiveness. The products formed are acid esters of the formula VII, which react in the third process stage to give the desired components of the formula I which carry hydroxyalkoxy groups.

The flame-resistant polyurethanes according to the invention are obtained by adding products of the formula I, by themselves or as a mixture with other flameproofing agents, together with polyhydroxy compounds (polyols), to polyisocyanates in the presence of catalysts, stabilizers and water or physical blowing agents in a manner which is known per se.

The flame-resistant polyurethanes according to the invention can optionally also be such that a) the flameproofing agent mixtures of the formula I have a phosphorus content of 15 to 20% by weight and a hydroxyl number of 30 to 300 mg of KOH/g;
b) they comprise 3 to 50 parts by weight of flameproofing agent mixture of the formula I per 100 parts by weight of the polyol usually employed for the preparation of the polyurethanes,
c) for the production of flexible polyurethane foams, polyether-polyols having hydroxyl numbers of 20 to 100 mg of KOH/g can be employed as the polyols and tolylene diisocyanates can be employed as polyisocyanates, as well as water as the blowing agent;
d) for the production of flame-resistant flexible polyurethane foams, 5 to 10 parts by weight of flameproofing agent mixture of the formula I are used per 100 parts of polyol;
e) for the production of rigid polyurethane foams, polyether-polyols having hydroxyl numbers of 300 to 1000 mg of KOH/g are employed as the polyols and diphenylmethane 4,4'-diisocyanate is employed as the polyisocyanate, as well as fluorochlorohydrocarbon R 141 b as the blowing agent,
f) for the production of flame-resistant rigid polyurethane foams, 20 to 30 parts by weight of flameproofing agent mixture of the formula I are used per 100 parts of polyol.

EXAMPLE 1

700 g (3.84 mol) of triethyl phosphate and 10.8 g of phosphorous acid were initially introduced into a reactor equipped with a stirrer, thermometer, gas inlet tube and reflux condenser. 454.5 g (1.6 mol) of $P_4O_{10}$ were added, while stirring vigorously and with exclusion of atmospheric moisture, such that the temperature did not exceed 40° C. The mixture was subsequently heated first at 60° C. for 1 hour and then at 90° C. for 5 hours. 34.6 g (1.92 mol) of water were slowly added to the cooled, yellowish reaction mixture, with external cooling with ice, such that the reaction temperature reached a maximum of 70° C. After the mixture had been stirred at 70° C. for 1 hour, ethylene oxide was passed in at a temperature of 130 to 140° C., until vigorous reflux was to be observed in the condenser which was charged with methanol and dry ice. After an after-reaction at 130 to 140° C. for 1 hour, the excess ethylene oxide which remained was removed from the reaction mixture by passing through a vigorous stream of nitrogen. 1813 g of a pale yellowish liquid having a Brookfield viscosity of 1570 mPa.s (25° C.), an acid number of 0.9 g of KOH/g and a hydroxyl number of 125 mg of KOH/g were thus obtained. The product (formula I) where $\bar{q}$ is 3, $R_3$ is ethyl (m is 0, $R_7$ is ethyl), $R_5$ and $R_6$. are H, contained 17.7% of phosphorus (% by weight).

EXAMPLE 2

The product according to Example 1 was incorporated into a flexible polyurethane foam of the following formulation (parts by weight):

| | |
|---|---|
| 100 | parts of polyether-polyol (® Caradol 48-2, Shell) |
| 7.5 | parts of product from Example 1 |
| 4.0 | parts of water |
| 0.4 | part of dimethylethanolamine |
| 0.2 | part of tin octoate (® Desmorapid SO, Bayer) |
| 1.0 | part of silicon stabilizer (® Tegostab B 3640, Goldschmidt) |
| 51 | parts of toluylene diisocyanate (® Desmodur T 80, Bayer) |

To produce the test foam, all the components—with the exception of the toluylenediisocyanate—were mixed intensively and the latter was then added. After a starting time of 15 seconds, a rising time of 150 seconds and an after-treatment of 15 minutes in ambient air of 140° C., a flexible polyurethane foam having a density of 29 kg/m³ was obtained.

EXAMPLE 3 (Comparison Example)

A test foam was produced analogously to the formulation and production instructions in Example 2 using 7.5 parts by weight, calculated with respect to the polyol employed, of a product according to Example 1 of DE-PS 20 36 595. After a starting time of 22 seconds, a rising time of 134 seconds and an after-treatment as described above, a flexible polyurethane foam having a density of 27 kg/m³ was obtained.

To determine the flame resistance of the test foams according to Example 2 (foam A) and Comparison Example 3 (foam B), the oxygen indices (LOI) were determined in accordance with ASTM-D-2863-77 and the American test FMVSS-302 (FMVSS=Federal Motor Vehicle Safety Standard) was carried out.

The foams were tested in respect of their fogging properties in accordance with DIN 75201-G.

The following results were obtained:

| | Foam A (according to the invention) | Foam B (Comparison) |
|---|---|---|
| Oxygen index (ASTM-D-2863-77) | 22.5 | 23.0 |
| FMVSS 302: | | |
| Classification: | SE[1] | SE[1] |
| average burning zone | 22 mm | 24 mm |
| Fogging value G (DIN 75201 G) | 0.6 mg | 2.7 mg |

[1]Self-extinguishing after an average burning zone of <38 mm.

The table clearly shows the outstanding properties of the flexible polyurethane foams according to the invention. While the excellent flame-retardant properties indeed can also be achieved by the known products according to DE-C 20 36 587 and 20 36 595, the superiority of the flexible polyurethane foams according to the invention is documented by the fact that the flame resistance is achieved without the use of halogen, and by the significantly reduced fogging value, which illustrates the drastically increased resistance to migration.

We claim:

1. A flame-resistant polyurethane containing as the flameproofing agent a mixture of oligomeric phosphoric acid esters which carry hydroxyalkoxy groups, of the formula I

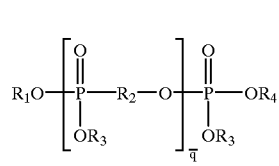

(I)

in which $\bar{q}$ denotes an average chain length of 0.5 to 10, $R_1$ is a hydroxyl-containing radical of the formula II a, $R_2$ is a radical of the formula III

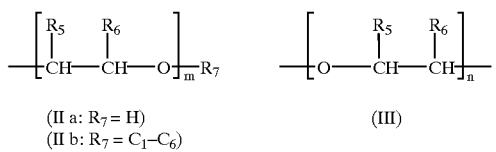

(II a: $R_7$ = H)  (III)
(II b: $R_7$ = $C_1$–$C_6$)

$R_3$ is a radical of the formula II b, $R_4$ is $R_1$ or $R_3$; $R_5$, $R_6$ and $R_7$ are an H atom or an alkyl radical having 1 to 6 carbon atoms, m is 0 to 4 and n is 1 to 4.

2. A flame-resistant polyurethane as claimed in claim 1, wherein the flameproofing agent of the formula I is obtained by reacting one or more ortho-phosphoric acid esters of the formula IV

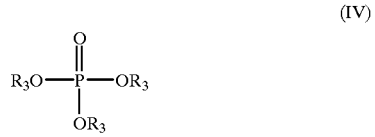

(IV)

with phosphorus pentoxide in a first stage in a molar ratio of (2.1 to 3.5): 1.0 at a temperature of 20 to 180° C. in the course of 0.5 to 72 hours, in the resulting polyphosphoric acid ester mixture of the formula V

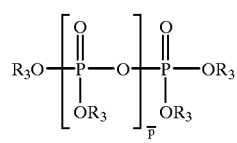
(V)

in which $\bar{p}$ denotes an average chain length of 4 to 60, partly hydrolyzing or glycolyzing the P—O—P bonds selectively in a second stage by addition of water or a glycol of the formula VI

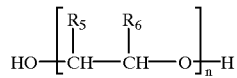
(VI)

in which $R_5$, $R_6$ and n have the abovementioned meaning, at a temperature of 20 to 100° C., and reacting the resulting mixture of polyphosphoric acid partial esters of the formula VII

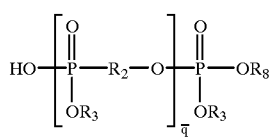
(VII)

in which $R_2$ has the abovementioned meaning or is zero, $\bar{q}$ denotes a reduced average chain length of only 0.5 to 10 and $R_8$ has the meaning of $R_3$ or is an H atom, with an epoxide of the formula VIII in a third stage at a temperature of 20 to 180° C.

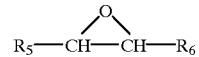
(VIII)

3. A flame-resistant polyurethane as claimed in claim 1, wherein the flameproofing agent mixture of the formula I has a phosphorus content of 15 to 20% by weight and a hydroxyl number of 30 to 300 mg of KOH/g.

4. A flame-resistant polyurethane as claimed in claim 1, containing 3 to 50 parts by weight of flameproofing agent mixture of the formula I per 100 parts by weight of the polyol employed for the preparation of the polyurethane.

* * * * *